United States Patent [19]

Suzuki et al.

[11] Patent Number: 5,556,595
[45] Date of Patent: Sep. 17, 1996

[54] SHEET MATERIAL FOR ELIMINATING METHYL BROMIDE, A MATERIAL THEREFOR OBTAINED BY WORKING THE SHEET INTO A FILTER FORM, AND A METHOD FOR ELIMINATING METHYL BROMIDE WITH THE SAME

[75] Inventors: Toshiyuki Suzuki, Ohmiya; Shigeru Maeda; Shigeo Hayashimoto, both of Takasaki; Mikio Ogawa, Fujioka; Norikazu Yoshida, Takasaki, all of Japan

[73] Assignee: Nippon Kayaku Kabushiki Kaisha, Tokyo, Japan

[21] Appl. No.: 240,760

[22] PCT Filed: Sep. 10, 1993

[86] PCT No.: PCT/JP93/01299

§ 371 Date: May 12, 1994

§ 102(e) Date: May 12, 1994

[87] PCT Pub. No.: WO94/06540

PCT Pub. Date: Mar. 31, 1994

[30] Foreign Application Priority Data

Sep. 14, 1992 [JP] Japan .................. 4-269110
Jun. 30, 1993 [JP] Japan .................. 5-183254

[51] Int. Cl.$^6$ .................................................. A01N 25/18
[52] U.S. Cl. .................................................. 422/32; 422/37
[58] Field of Search .................................. 422/32, 37

[56] References Cited

U.S. PATENT DOCUMENTS 4,014,670 3/1977 Young ........................ 55/274
4,812,291 3/1989 Friemel et al. .................. 422/32
4,966,755 10/1990 Smith ............................ 422/37
5,213,604 5/1993 Saito et al. .................... 504/114

FOREIGN PATENT DOCUMENTS 0307229 of 1989 European Pat. Off. .
48-2116 of 1973 Japan .
53-15029 of 1978 Japan .
53-81483 of 1978 Japan .
55-49124 of 1980 Japan .
57-162630 of 1982 Japan .
58-210831 of 1983 Japan .
2164870 of 1986 United Kingdom .

OTHER PUBLICATIONS

DATABASE WPI Section Ch, Week 7820, Derwent Publications Ltd., London, GB; Class A10, AN 78–35427A & JP–A–53 035 712 (UNI CHARM K.K.) 3 Apr. 1978 Abstract.

*Primary Examiner*—Timothy McMahon
*Attorney, Agent, or Firm*—Nields & Lemack

[57] ABSTRACT

According to a sheet material for eliminating methyl bromide obtained by forming an activated carbon-containing paper, spraying a solution of an amine compound to it or impregnating it with the solution, and drying it, it is accomplished to remove remaining methyl bromide after fumigating agricultural products with methyl bromide, and prevent damage to the agricultural products and emission thereof in the atmosphere, which are on the basis that methyl bromide kept in the agricultural products is gradually released and concentration thereof rises a high level in a container.

14 Claims, No Drawings

5,556,595

SHEET MATERIAL FOR ELIMINATING METHYL BROMIDE, A MATERIAL THEREFOR OBTAINED BY WORKING THE SHEET INTO A FILTER FORM, AND A METHOD FOR ELIMINATING METHYL BROMIDE WITH THE SAME

DESCRIPTION

1. Industrially Applicable Field

The present invention relates to a sheet material for eliminating methyl bromide which, after a fumigating operation with methyl bromide, is available for eliminating remaining methyl bromide, and to a process for eliminating remaining methyl bromide with it.

2. Prior Art

To use methyl bromide is indispensable in extermination of vermin in importing or exporting agricultural products and before storage thereof. As an instance involving use of a large amount of methyl bromide, there is a case of fumigating agricultural products, particularly fruits and vegetables with methyl bromide in exporting or importing them. In many case, methyl bromide remaining after the fumigation is subjected to burning or alkali-washing treatment requiring much cost.

In common farmers, however, such disposal of the remaining methyl bromide cannot usually be carried out owing to economic problems and thus it is emitted into the atmosphere, as it is.

In case of fumigating agricultural products with methyl bromide, the remaining methyl bromide immediately after completion of the fumigating treatment is treated by e.g., the above-mentioned manner, until the environment in a fumigating warehouse reaches at least a level of a work-permitting standard. Then, the agricultural products will be preserved within a certain period by storing them in a storehouse or by packing them into boxes. During such a preserving period, methyl bromide kept in the agricultural products by the fumigating treatment is gradually emitted off. In a certain instance, the concentration of methyl bromide in a container was over 500 ppm.

In such cases, when people work in the state that the container is open, a high level of methyl bromide may be emitted around the working area, thereby effecting a bad influence on human bodies. In the light of the recent position of preservation of the environment of the earth, restriction of emitting halogen compounds is important. In view of this matter, emitting methyl bromide into the atmosphere is not preferred. Furthermore, a high level of methyl bromide in the container contacts the agricultural products for a long time, so that both drop in their qualities and injury may occur. Thus, damages thereof are observed.

In particular when an environmental change happens, for example, the change such that temperature rises from a low temperature as in a refrigerator to ambient temperature at a working environment, much methyl bromide is emitted from agricultural products. Thus, they are seriously injured. All of these phenomena do not break out by injury with methyl bromide. It is however sure that methyl bromide is one of the main causes thereof.

For example, control of temperature and moisture degree, and investigation on the amount of ventilation are performed, in order to prevent such a bad effect based on methyl bromide as mentioned above. At present, however, direct remove of methyl bromide has seldom been carried out.

As an agent for eliminating methyl bromide, an absorbent is disclosed in JP-B-48-2116 and known in which hexamethylenetetramine is added and absorbed onto activated carbons. This is an agent for a gas mask and is used for eliminating methyl bromide to be absorbed in a body. At the present situation, it does not effect an adequate advantage for eliminating methyl bromide of a relatively high concentration in the atmosphere, e.g., after fumigation.

Problems to be Solved by the Invention

In the light of such a situation, a means is desired which makes it possible to remove remaining methyl bromide after fumigation directly and efficiently; and to control, at the minimum level, injury to agricultural products with the remaining methyl bromide, harm to humans and animals with it, and emission thereof into the atmosphere.

Means for Overcoming the Problems

The inventors have investigated eagerly to overcome the above-mentioned problems. As a result, they have found that a sheet material for eliminating methyl bromide obtained by forming a paper mixed with activated carbons and adding or sticking an amine compound thereto can efficiently be set into a container so as to match with its shape and size and that it has an ability to remove methyl bromide promptly and efficiently. Thus, the invention has been accomplished.

The present inventions are therefore as follows:

(1) a sheet material for eliminating methyl bromide, which is produced by impregnating with an amine compound an activated carbon-containing paper made from a dispersion liquid containing activated carbon powders and cellulose fiber, and drying it:

(2) a sheet material for eliminating methyl bromide according to (1), wherein the dispersion liquid contains a binder and a flocculating agent;

(3) a sheet material for eliminating methyl bromide according to (1), wherein the binder is a cationic acrylic resin and the flocculating agent is a polyacrylamide type resin;

(4) a sheet material for eliminating methyl bromide according to (1), wherein the particle size of the activated carbons is from 60 to 400 mesh;

(5) a sheet material for eliminating methyl bromide according to (3), wherein the cationic acrylic resin is dimethyaminoethyl acrylate polymer, or a copolymer of a diallylamine quaternary salt and an acrylic compound;

(6) a sheet material for eliminating methyl bromide according to (3), wherein the polyacrylamide type resin is at least one selected from polyacrylamide, a copolymer of acrylamide and sodium acrylate, and Mannich modified compound of polyacrylamide;

(7) a sheet material for eliminating methyl bromide according to (1), wherein the amine compound is at least one selected from monoethanolamine, diethanolamine, triethylenediamine, hexamethylenetetramine, morpholine, pyperazine, and alkylaminopyridine;

(8) a filter comprising a sheet material for eliminating methyl bromide according to (1);

(9) a filter according to (8), which is worked into the form of pleats;

(10) a filter according to (8), which is worked into the form of a one-side corrugated board;

(11) a filter according to (8), which is worked into the form of a honeycomb;

(12) a packing or packaging material, comprising a sheet material for eliminating methyl bromide according to (1);

(13) a packing or packaging material according to (12), which is worked into the form of pleats;

(14) a packing or packaging material according to (12), which is worked into the form of a one-side corrugated board; and

(15) a process for eliminating methyl bromide by using a material for eliminating methyl bromide, a filter, or a packing or packaging material according to any one of (1) to (14).

The present invention will be described in detail below.

As the activated carbon used in the invention, any special type thereof is not required. It may be any one which can be mixed, in a form of powders, with cellulose to form a paper. There are no specific limitations on its physical properties such as specific surface area, distribution of fine pores and pH. The particle size of the activated carbons is preferably from 60 to 400 mesh, and more preferably from 100 to 300 mesh.

The cellulose fiber, which is not limited to specific ones, may be any cellulose fiber which can be formed into a paper. The ratio of the cellulose fiber to the activated carbons is any value available. Preferably the amount of the cellulose fiber and that of the activated carbons are 30–70% by weight and 70–30% by weight, respectively, on the basis of the total thereof.

It is preferred to disperse active carbons and cellulose fiber into a dispersing medium such as water, thereby preparing a dispersion liquid and add thereinto a binder such as a cationic aclyric resin. This acts as an agent for binding the activated carbons to cellulose fiber and effects an advantage of increasing strength of an activated carbon-containing paper to be formed. The optional binder such as a cationic acrylic resin tends to increase in hardness excessively, if the amount to be added is much. Thus, in order to obtain a sheet material having good post-processability it is preferred to add the binder of 1 to 10 percent by weight of the activated carbons, when available.

The kind of the binder, which is not limited to specific ones, is preferably a cationic acrylic resin. Preferred examples include dimethylaminoethylacrylate polymer; and a copolymer of a diallyamine quaternary salt and an acrylic compound.

Furthermore, it is preferred to add a flocculating agent such as a polyacrylamide type flocculating agent into the above-mentioned dispersion liquid. This effects the advantage of forming floc in the dispersion liquid during a paper-producing step, and makes paper-production from a slurry easy. The amount of the flocculating agent to be optionally added is preferably from 0.01 to 1 percent by weight of the activated carbons.

The kind of the flocculating agent, which is not limited to specific ones, is preferably one among polyacrylamide types. Preferred examples include polyacrylamide, acrylamide-sodium acrylate copolymers, and Mannich modified compounds of polyacrylamide.

In the invention, the concentration of the dispersion liquid may be adjusted appropriately. It is usually adjusted so that the concentration of the solid therein will be 0.1–10% by weight, preferably 0.5–5% by weight. Production of an activated carbon-containing paper from the dispersion liquid can be carried out by any known method. Subsequently, the obtained paper is impregnated with a solution of an amine compound.

The kind of the amine compound, which is not limited to specific ones, is preferably a strong base amine. Preferred examples thereof include monoethanolamine, diethanolamine, triethylenediamine, hexamethylenetetramine, morpholine, piperazine, and aklylaminopyridine.

The amine compound is dissolved in a solvent such as water or methanol. An activated carbon-containing paper is impregnated with this solution. The concentration of the amine compound in the solution, which is not limited to specific ones, is usually 0.5–20% by weight. The amount of the amine compound in the activated carbon-containing paper produced in the form of sheet, which is not limited to specific ones, is preferably 1–50% by weight, more preferably 5–30% by weight of the amount of the activated carbons in the paper.

The method for impregnating the activated carbon-containing paper with the amine compound, which is not limited to specific ones, may be any method for carrying out the impregnation with the amine compound efficiently. For example, a method may be taken wherein the amine compound in an aqueous solution or an organic solution is sprayed or wherein the activated carbon-containing paper is dipped into a solution of the amine compound. Furthermore, a method for drying it, which is not limited to specific ones, may be conventional one. The weight per unit area of thus obtained sheet material for eliminating methyl bromide according to the invention, which is not limited to specific ones, is usually within ranges from 50 to 400 g/m$^2$. In such a manner as described above, the sheet material for eliminating methyl bromide according to the invention can be obtained.

The activated carbon-containing paper in a filter form according to the invention will be explained below.

The sheet material for eliminating methyl bromide according to the invention may be worked, for example, into a filter form to be used. The working method is not limited to specific ones. For example, a filter may be made in which an air-transmitting area is large so as to control resistance against gas transmission at a low level and the rate of the air transmission through the filter is low. That is, a filter in the form of pleats may be made by fold-working a sheet material for eliminating methyl bromide.

A filter for eliminating methyl bromide in the form of a honeycomb may be obtained by working one sheet material for eliminating methyl bromide into a corrugated form; bonding it to another sheet material kept in a plain form to produce a one side-corrugated board; layering such plural boards in the form of blocks and in such a manner as the corrugations of the one side-corrugated boards match with each other; bonding them to each other and cutting the bound material into a suitable size. A cylindrical filter for eliminating methyl bromide may be obtained by winding the above-mentioned one side-corrugated board in such a manner as the direction of grooves shaped by the corrugations becomes axial one. The material for eliminating methyl bromide in a filter form, obtained as above, has the characteristic that resistance against gas transmission is very small. Any working method is available, if the method results in a product which can be used as a filter.

Furthermore, as a packaging or packing material according to the invention, the sheet material for eliminating methyl bromide obtained by the above-mentioned method can be used as it is. Furthermore, as illustrated about the above-mentioned activated carbon containing paper, a sheet material for eliminating methyl bromide may be used by working it into the form of pleats or in the form of a one-side corrugated board. The method for making a packing material from a sheet material in the above form for eliminating methyl bromide, which is not limited to specific ones, may be any available, known methods. For example, there is a method which involves cutting the material for eliminating methyl bromide into a suitable size and/or working it in a box form. In this case, the packing material is reinforced with e.g., a suitable woody material or styrene foam. As a packing material of the invention, there can be used a packing material, such as a corrugated board box, whose inside wall is lined with a sheet material for eliminating methyl bromide according to the invention.

The material for eliminating methyl bromide, the filter, or the packaging or packing material according to the invention may generally be used from 0° to 50° C.

The material for eliminating methyl bromide, the filter, or the packaging or packing material according to the invention has a high ability to eliminate methyl bromide and is very safe in use thereof because stains of subject agricultural products owing to drop of activated carbons cannot be shown. Also, the invention has an ability to eliminate methyl bromide very promptly in the atmosphere because it may be in the from of a sheet or filter. The shape thereof makes it possible to achieve package or covering which is a good match for any object. Thus, methyl bromide can be eliminate efficiently.

EXAMPLES

The invention will be explained more specifically by means of Examples. The invention is not however limited to them.

Example 1

Pound pulp was weighted at a level of 5.6 g as dry weight. The pulp was dispersed into about 1 liter of water. To it was added 6.9 g of activated carbons (100–300 mesh), followed by mixing it. Then, to the mixture was added 0.28 g of a cationic acrylic resin (KAYACRYL RESIN EC-003 ex NIPPON KAYAKU KABUSHIKI KAISHA), the weight of solid of the resin being 5% by weight of the activated carbons, followed by mixing it. Subsequently, a polyacrylamide type flocculating agent (ACCOFLOC A-120, ex MITSUICYANAMID, ltd.) was added thereto at a level of 0.2% by weight of the activated carbons followed by mixing and diluting it with 20 liter of water to produce a pre-paper material in 25 square centimeters. The produced activated carbon-containing pre-paper material was dried at 120° C. for 5 minutes; dipped into an aqueous solution of triethylenediamine so that the pre-paper would contain 10%, by weight of the contained activated carbons, of triethylenediamine; and dried.

The sheet material in 25 square centimeters for eliminating methyl bromide obtained in the above-mentioned manner was cut into a size of 9 cm×10 cm, wrapped in a non-woven polyester cloth having a good gas transmission. Its open portion was heat-sealed. Then, it was hung in a 2 liter glass container sealed highly.

Methyl bromide was introduced into the glass container in which the sheet material for eliminating methyl bromide was set, so that concentration of it would be 2000 ppm. As time passed, concentration of methyl bromide in the container was measured. (Measurement by gas chromatography, the same below)

The result showed that concentration thereof was 0.4 ppm at 10 minutes after introducing methyl bromide.

Examples 2–5

Sheet materials for eliminating methyl bromide were made in the same manner as in Example 1 except that each of amine compounds shown in Table 1 was used instead of triethylenediamine, and then the same tests were carried out to analyze effects. The results are shown in Table 1.

TABLE 1

| Examples | amine compounds | concentration of methyl bromide after 10 minutes |
|---|---|---|
| 2 | hexamethylenetetramine | 118 ppm |
| 3 | monoethanolamine | 254 ppm |
| 4 | morpholine | 49 ppm |
| 5 | diethanolamine | 315 ppm |

Example 6

A sheet material for eliminating methyl bromide was produced in the same manner as in Example 1. A test was carried out in the same manner as in Example 1 except that the size of this sheet was adjusted to 6 cm × 6 cm (corresponding to 40% of the sheet used in Example 1). The result is shown in Table 2.

Example 7

A sheet material was produced and tested in the same manner as in Example 1 except that the amount of triethylendiamine was adjusted to 25% by weight of activated carbons. The result is shown in Table 2.

Example 8

A sheet material was produced and tested in the same manner as in Example 1 except that the amount of triethytenediamine was adjusted to 25% by weight of activated carbons and that the size of this sheet was adjusted to 6 cm × 6 cm (corresponding to 40% of the sheet of Example 1). The result is shown in Table 2.

TABLE 2

| Examples | Ratio of the area of the sheet | Ratio of the amount of amine | Concentration of methyl bromide after 10 minute |
|---|---|---|---|
| 1 | 1.0 (basis) | 1.0 (basis) | 0.4 ppm |
| 6 | 0.4 | 0.4 | 0.8 ppm |
| 7 | 1.0 | 2.5 | 0.3 ppm |
| 8 | 0.4 | 1.0 | 0.6 ppm |

Comparative Example 1

An activated carbon-containing paper obtained as in Example 1 was cut into a size of 9 cm × 10 cm without impregnation with triethylenediamine, and enveloped with the same non-woven cloth. A test was carried out. The result is shown in Table 3.

Comparative Example 2

Pulp as in Example 1 was used. The total weight per unit area was adjusted to the same as in Example 1 without mixing activated carbons. Triethylenediamine was added and sticked to it. A test was carried out in the same manner as in Example 1 except the above-mentioned matters. The result is shown in Table 3.

Comparative Examples 3–5

A paper was produced in the same manner as in Example 1 except using each of silica, naturally-occurring zeolite and synthetic zeolite instead of the activated carbons in Example 1. Triethylenediamine was added and sticked to it, and then a test was carried out. Each result is shown in Table 3.

Comparative Example 6

In a non-woven cloth having the same size as in Example 1, enveloped was 1 g of particulate activated carbons (particle size: 1–3 mm) to which an amine compound had been added and sticked. The activated carbons were ones charged in a methyl bromide-avoiding gas mask commercially available. The result is shown in Table 3.

TABLE 3

|  | Mixed material | Presence of Amine | Concentration of methyl bromide after 10 minutes |
| --- | --- | --- | --- |
| Comparative Example 1 | activated carbons | no | 517 ppm |
| Comparative Example 2 | none | yes | 1780 ppm |
| Comparative Example 3 | silica | yes | 1536 ppm |
| Comparative Example 4 | naturally-occurring zeolite | yes | 1811 ppm |
| Comparative Example 5 | synthetic zeolite | yes | 1772 ppm |
| Comparative Example 6 | only particulate activated carbons | yes | 1298 ppm |

Example 9

Ten kilograms of oranges (sort: Unshyu mikan) were fumigated with methyl bromide of concentration of 48 g/m$^3$ at 15° C. in a 40 liter closed container made of polyacrylate for 2 hours. Into a 28 liter corrugated board box were charged 4 kg out of the above oranges (28 ones). Then, the sheet material for eliminating methyl bromide produced in Example 1 was cut into a size of 9 cm × 10 cm, and set into the container immediately after the fumigation of the oranges. Concentration of methyl bromide in the container was measured after 7 and 24 hours. Each of the results was below 1 ppm. The results demonstrated that methyl bromide emitted from the oranges was absorbed on the sheet material.

In the Examples and Comparative Examples below, fumigation of fruits with methyl bromide was carried out in the same manner as in the present Example.

Comparative Example 7

Fumigation was carried out in the same manner as in Example 9 except that any material for eliminating methyl bromide was not used. Then, concentration of methyl bromide was measured. After 7 hours, it was 787 ppm. After 24 hours, it was 176 ppm.

Example 10

Persimmons (sort: Fuyu persimmons) were fumigated with methyl bromide of concentration of 48 g/m$^3$ at 15° C. for 2 hours. Five kilo grams of the persimmons (21 ones) after the fumigation were charged into a bag made of polyethylene having 50 μm in thickness, and then its open mouth was closed with a rubber band. At this time, one sheet material for eliminating methyl bromide (size: 25 cm × 25 cm) was enclosed therewith. The bag was stored at 2° C. for 14 days. Concentration of methyl bromide was measured after 12 hours and 5 days. The results were 8 ppm and below detection limit, respectively.

Comparative Example 8

Concentration of methyl bromide was measured in the same manner as in Example 10 except that any sheet material for eliminating methyl bromide was not inserted. After 12 hours and 5 days, 530 ppm and 60 ppm of methyl bromide were detected, respectively.

Example 11

Apples (sort: Bugged apple, Fuji) were fumigated with methyl bromide of concentration of 40 g/m$^3$ at 10° C. for 2 hours. For 1 hour after the fumigation, they were kept under ventilation. Into a bag made of polyethylene having 50 μm in thickness were charged both 5 kg out of the above fumigated apples (15 ones) and one sheet material for eliminating methyl bromide (size: 25 cm × 25 cm) as in Example 1. A preservation test was carried out by preserving it at 0° C. for 17 days and further at 15° C. for 5 days.

After this test, the apples were cut longitudinally and the areas where the color of cut surfaces was changed into brown were investigated. The color of 1.6% of the total cut areas was changed into brown.

Comparative Example 9

The areas where the color of apples was changed into brown were investigated in the same manner as in Example 11 except that a material for eliminating methyl bromide was not inserted. The color of 42.3% of the total cut areas was changed into brown.

Example 12

Two sheets material for eliminating methyl bromide were produced in the same manner as in Example 1. The one was worked into a corrugated sheet. It was bound to the other sheet kept in a plain form to produce a one-side corrugated board. In the same manner, some one-side corrugated boards were produced. They were layered in the form of blocks and bound to each other so that their corrugations would match with each other. The resultant board was cut so that openings at the cut surfaces would not be closed and the thickness in an amplitude direction of the corrugations would be 4 cm, so as to obtain a filter material for eliminating methyl bromide having 11.5 cm in length and 21 cm in wideness. The area of the sheet material for eliminating methyl bromide used as this filter was 1 m$^2$.

Example 13

Grapes (sort: Kyohou) were fumigated with methyl bromide of concentration of 48 g/m$^3$ at 15° C. for 3 hours. For 1 hour after the fumigation, they were kept under ventilation to remove off the remaining methyl bromide.

The filter material for eliminating methyl bromide obtained in Example 12 was set at the part for absorbing a circulating cool gas in a cool gas circulating type refrigerator having a capacity of 700 liter. Then, 90 kg of the above-mentioned grapes after the fumigation were introduced into this refrigerator, and then they were stored at 0° C. for 14 hours.

Concentration of methyl bromide in the refrigerator was measured at 4 and 24 hours after the preservation test started. The results were 3 ppm and below 1 ppm, respectively.

Comparative Example 10

Under the same conditions as in Example 12, the same operations were carried out except that any filter material for eliminating methyl bromide as obtained in Example 12 was not set into the cool gas circulating type refrigerator.

Concentration of methyl bromide in the refrigerator was measured at 4 and 24 hours after the preservation test started. The results were 466 ppm and 250 ppm, respectively.

Example 14

Three sheet materials for eliminating methyl bromide were produced in the same manner as in Example 1. One of them was worked into a corrugated sheet. The other two sheets sandwiched it and they were bound to each other to produce a corrugated board. The resulting corrugated board was cut and folded to give a packing material in the form of a box having 43 cm in length, 36 cm in wideness and 12 cm in height, according to the invention. The area of the material for eliminating methyl bromide which was used for this packing material was 2.6 m$^2$.

Example 15

A corrugated board box (length: 43 cm, wideness: 36 cm, height: 12 cm, thickness of the board: 0.4 cm) was lined with the sheet material for eliminating methyl bromide obtained in Example 1 to obtain a packing material according to the invention.

Examples 16 & 17

Apples (sort: Fuji) were fumigated with methyl bromide of concentration of 50 g/m$^3$ at 10° C. after 2 hours. After the fumigation, they were kept under ventilation for 1 hour to remove off the remaining methyl bromide.

The apples after the fumigation were packaged with the packing material obtained in Examples 14 and 15, and it was closed. It was stored in a cool gas circulating type refrigerator at 0° C. for 14 days.

Concentration of methyl bromide was measured at 1 and 6 hours after the preservation test. The measured results are shown in Table 4. Also, concentration of methyl bromide in the refrigerator was measured at 1 and 6 hours after the preservation test. Each of the results showed none of methyl bromide.

TABLE 4

| Examples | Packing material | Concentration of methyl bromide | |
|---|---|---|---|
| | | after 1 hours | after 6 hours |
| 16 | Example 14 | 1 ppm | 0 ppm |
| 17 | Example 15 | 1 ppm | 0 ppm |

We claim:

1. A sheet material for eliminating methyl bromide, which is produced by impregnating an activated carbon-containing paper made from a dispersion liquid containing activated carbon powders and cellulose fiber with at least one amine compound selected from the group consisting of monoethanolamine, diethanolamine, triethylenediamine, hexamethylenetetramine, morpholine, piperazine and alkylaminopyridine; and drying it.

2. A sheet material for eliminating methyl bromide according to claim 1, wherein the dispersion liquid contains a binder and a flocculating agent.

3. A sheet material for eliminating methyl bromide according to claim 1, wherein the binder is a cationic acrylic resin and the flocculating agent is a polyacrylamide type resin.

4. A sheet material for eliminating methyl bromide according to claim 1, wherein the particle size of the activated carbons is from 60 to 400 mesh.

5. A sheet material for eliminating methyl bromide according to claim 3, wherein the cationic acrylic resin is dimethyaminoethyl acrylate polymer, or a copolymer of a diallylamine quaternary salt and an acrylic compound.

6. A sheet material for eliminating methyl bromide according to claim 3, wherein the polyacrylamide type resin is at least one selected from polyacrylamide, a copolymer of acrylamide and sodium acrylate, and Mannich modified compound of polyacrylamide.

7. A filter comprising a sheet material for eliminating methyl bromide according to claim 1.

8. A filter according to claim 7, which is worked into the form of pleats.

9. A filter according to claim 7, which is worked into the form of a one-side corrugated board.

10. A filter according to claim 7, which is worked into the form of a honeycomb.

11. A packing or packaging material, comprising a sheet material for eliminating methyl bromide according to claim 1.

12. A packing or packaging material according to claim 11, which is worked into the form of pleats.

13. A packing or packaging material according to claim 11, which is worked into the form of a one-side corrugated sheet.

14. A process for eliminating methyl bromide by using a material for eliminating methyl bromide, a filter, or a packing or packaging material according to any one of claims 1 to 13.

* * * * *